United States Patent
Balteau et al.

(10) Patent No.: US 9,004,761 B2
(45) Date of Patent: Apr. 14, 2015

(54) MULTIPLE CHAMBER CONTAINER WITH MISTAKE PROOF ADMINISTRATION SYSTEM

(75) Inventors: Patrick Balteau, Evelette (BE); Jean-Pierre Hartman, Rhode-St-Genese (BE); Paul Vidrequin, Ghislenghien (BE); Silvano Sforacchi, Grosotto (IT); John Doherty, County Mayo (IE); Charlie Mulvihill, County Roscommon (IE); Noel Smith, County Mayo (IE); Marc Cousin, Ellezelles (BE)

(73) Assignees: Baxter International Inc., Deerfield, IL (US); Baxter Healthcare S.A., Glattpark (Opfikon) (CH)

( * ) Notice: Subject to any disclaimer, the term of this patent is extended or adjusted under 35 U.S.C. 154(b) by 2164 days.

(21) Appl. No.: 11/381,041

(22) Filed: May 1, 2006

(65) Prior Publication Data

US 2007/0261974 A1    Nov. 15, 2007

(51) Int. Cl.
| | |
|---|---|
| *B65D 30/22* | (2006.01) |
| *A61J 1/20* | (2006.01) |
| *B65D 81/32* | (2006.01) |
| *B29C 65/18* | (2006.01) |

(Continued)

(52) U.S. Cl.
CPC ........... *A61J 1/2093* (2013.01); *B65D 81/3266* (2013.01); *B29C 65/18* (2013.01); *B29C 65/76* (2013.01); *B29C 66/1122* (2013.01); *B29C 66/223* (2013.01); *B29C 66/244* (2013.01); *B29C 66/2442* (2013.01); *B29C 66/43* (2013.01); *B29C 66/81427* (2013.01); *B29C 66/919* (2013.01); *B29C 66/9161* (2013.01); *A61J 1/10* (2013.01); *A61J 2001/2024* (2013.01); *B29C 66/0042* (2013.01); *B29L 2031/7148* (2013.01); *B29C 66/91421* (2013.01)

(58) Field of Classification Search
USPC ...................... 383/38; 206/219; 604/408–410
See application file for complete search history.

(56) References Cited

U.S. PATENT DOCUMENTS

| | | | |
|---|---|---|---|
| 2,714,974 A | 8/1955 | Sawyer | |
| 2,907,173 A | 10/1959 | Robbins | |

(Continued)

FOREIGN PATENT DOCUMENTS

| | | |
|---|---|---|
| BE | 894 377 | 1/1983 |
| BR | 9 905 055 | 6/2001 |

(Continued)

OTHER PUBLICATIONS

English Translation of JP 2001-097394.

(Continued)

*Primary Examiner* — J. Gregory Pickett
*Assistant Examiner* — Peter Helvey
(74) *Attorney, Agent, or Firm* — K&L Gates LLP (57) ABSTRACT

The present disclosure provides a multiple chamber container that includes a container body sealed around a peripheral edge and having an outlet. The container also includes a first peel seal having a projecting portion and a second peel seal that isolates the outlet. The second peel seal may also include a projecting portion. The first and second peel seals may be configured to define a symmetrical chamber. The chamber may include an axis of symmetry extending between the first and second projecting portions. The chamber geometry of the container ensures a correct sequential opening of the first and second peel seals.

29 Claims, 8 Drawing Sheets

(51) Int. Cl.
  B29C 65/76 (2006.01)
  B29C 65/00 (2006.01)
  *A61J 1/10* (2006.01)
  *B29L 31/00* (2006.01)

(56) References Cited

U.S. PATENT DOCUMENTS

| | | | |
|---|---|---|---|
| 3,023,587 A | 3/1962 | Robbins | |
| 3,028,000 A | 4/1962 | Clements et al. | |
| 3,036,894 A * | 5/1962 | Forestiere | 436/165 |
| 3,074,544 A | 1/1963 | Bollmeier et al. | |
| 3,113,986 A | 12/1963 | Breslow et al. | |
| 3,149,943 A | 9/1964 | Amador | |
| 3,190,499 A | 6/1965 | Dow | |
| 3,257,072 A | 6/1966 | Reynolds | |
| 3,294,227 A | 12/1966 | Schneider et al. | |
| 3,324,663 A | 6/1967 | McLean | |
| 3,474,898 A | 10/1969 | Montgomery | |
| 3,608,709 A | 9/1971 | Pike | |
| 3,692,493 A | 9/1972 | Terasaki | |
| 3,708,106 A | 1/1973 | Sargent | |
| 3,749,620 A | 7/1973 | Montgomery | |
| 3,847,279 A * | 11/1974 | Montgomery | 206/219 |
| 3,879,492 A | 4/1975 | Bontinick | |
| 3,950,158 A | 4/1976 | Gossett | |
| 3,964,604 A * | 6/1976 | Prenntzell | 206/219 |
| 4,000,996 A | 1/1977 | Jordan | |
| 4,226,330 A | 10/1980 | Butler | |
| 4,226,952 A | 10/1980 | Halasa et al. | |
| 4,402,402 A * | 9/1983 | Pike | 206/219 |
| 4,496,046 A | 1/1985 | Stone et al. | |
| 4,519,499 A | 5/1985 | Stone et al. | |
| 4,537,184 A * | 8/1985 | Williams, Jr. | 602/8 |
| 4,608,043 A | 8/1986 | Larkin | |
| 4,629,080 A | 12/1986 | Carveth | |
| 4,759,472 A * | 7/1988 | Strenger | 222/92 |
| 4,770,295 A | 9/1988 | Carveth et al. | |
| 4,798,605 A | 1/1989 | Steiner et al. | |
| 4,890,744 A * | 1/1990 | Lane et al. | 222/107 |
| 4,961,495 A | 10/1990 | Yoshida et al. | |
| 4,997,083 A | 3/1991 | Loretti et al. | |
| 5,035,348 A * | 7/1991 | Seifert | 222/107 |
| 5,114,004 A * | 5/1992 | Isono et al. | 206/222 |
| 5,128,414 A | 7/1992 | Hwo | |
| 5,139,831 A | 8/1992 | Mueller | |
| 5,176,634 A | 1/1993 | Smith et al. | |
| 5,186,998 A | 2/1993 | Eugster | |
| 5,195,658 A * | 3/1993 | Hoshino | 222/92 |
| 5,207,320 A * | 5/1993 | Allen | 206/220 |
| 5,207,509 A | 5/1993 | Herbert | |
| 5,209,347 A * | 5/1993 | Fabisiewicz et al. | 206/219 |
| 5,263,609 A * | 11/1993 | Hoshino | 222/92 |
| 5,267,646 A | 12/1993 | Inoue et al. | |
| 5,287,961 A | 2/1994 | Herran | |
| 5,334,180 A | 8/1994 | Adolf et al. | |
| 5,391,163 A | 2/1995 | Christine et al. | |
| 5,423,421 A | 6/1995 | Inoue et al. | |
| 5,462,526 A | 10/1995 | Barney et al. | |
| 5,474,818 A | 12/1995 | Ulrich et al. | |
| 5,482,771 A | 1/1996 | Shah | |
| 5,494,190 A | 2/1996 | Boettcher | |
| 5,509,898 A | 4/1996 | Isono et al. | |
| 5,514,123 A | 5/1996 | Adolf et al. | |
| 5,520,975 A | 5/1996 | Inoue et al. | |
| 5,577,369 A | 11/1996 | Becker et al. | |
| 5,610,170 A | 3/1997 | Inoue et al. | |
| 5,706,937 A | 1/1998 | Futagawa et al. | |
| 5,728,681 A | 3/1998 | Kido et al. | |
| 5,792,213 A | 8/1998 | Bowen | |
| 5,849,843 A | 12/1998 | Laurin et al. | |
| 5,865,309 A | 2/1999 | Futagawa et al. | |
| 5,928,213 A | 7/1999 | Barney et al. | |
| 5,944,709 A | 8/1999 | Barney et al. | |
| 5,967,308 A * | 10/1999 | Bowen | 206/219 |
| 5,998,019 A | 12/1999 | Rosenbaum et al. | |
| 6,004,636 A | 12/1999 | Nicola et al. | |
| 6,007,529 A * | 12/1999 | Gustafsson et al. | 604/410 |
| 6,017,598 A | 1/2000 | Kreischer et al. | |
| 6,024,220 A | 2/2000 | Smith et al. | |
| 6,036,004 A * | 3/2000 | Bowen | 206/219 |
| 6,036,719 A | 3/2000 | Meilus | |
| 6,039,719 A | 3/2000 | Wieslander et al. | |
| 6,039,720 A * | 3/2000 | Wieslander | 604/410 |
| 6,083,587 A | 7/2000 | Smith et al. | |
| 6,117,123 A | 9/2000 | Barney et al. | |
| 6,129,925 A | 10/2000 | Kido et al. | |
| 6,149,655 A | 11/2000 | Constantz et al. | |
| 6,165,161 A | 12/2000 | York et al. | |
| 6,186,998 B1 | 2/2001 | Inuzuka et al. | |
| 6,203,535 B1 | 3/2001 | Barney et al. | |
| 6,231,559 B1 | 5/2001 | Loretti | |
| 6,269,979 B1 | 8/2001 | Dumont | |
| 6,280,431 B1 | 8/2001 | Domkowski et al. | |
| 6,297,046 B1 | 10/2001 | Smith et al. | |
| 6,309,673 B1 | 10/2001 | Duponchelle et al. | |
| 6,319,243 B1 | 11/2001 | Becker et al. | |
| 6,341,802 B1 | 1/2002 | Matkovich | |
| 6,398,771 B1 * | 6/2002 | Gustafsson et al. | 604/410 |
| 6,399,704 B1 | 6/2002 | Laurin et al. | |
| 6,468,259 B1 * | 10/2002 | Loretti et al. | 604/410 |
| 6,484,874 B1 | 11/2002 | Kageyama et al. | |
| 6,645,191 B1 | 11/2003 | Knerr et al. | |
| 6,682,517 B1 * | 1/2004 | Ezaki et al. | 604/410 |
| 6,692,150 B2 * | 2/2004 | Hoshino | 383/210 |
| 6,743,451 B2 | 6/2004 | Rasile et al. | |
| 6,844,038 B2 * | 1/2005 | Gollier et al. | 428/35.7 |
| 6,846,305 B2 | 1/2005 | Smith et al. | |
| 7,040,483 B2 * | 5/2006 | Inuzuka et al. | 206/219 |
| 7,175,614 B2 * | 2/2007 | Gollier et al. | 604/410 |
| 7,597,691 B2 * | 10/2009 | Kawaguchi et al. | 604/408 |
| RE41,273 E * | 4/2010 | Perell | 383/210 |
| 2001/0000042 A1 | 3/2001 | Inuzuka et al. | |
| 2002/0115795 A1 | 8/2002 | Shang et al. | |
| 2002/0138066 A1 | 9/2002 | Manica et al. | |
| 2003/0047467 A1 | 3/2003 | Smith et al. | |
| 2003/0075516 A1 * | 4/2003 | Rothman et al. | 210/806 |
| 2003/0077466 A1 | 4/2003 | Smith et al. | |
| 2003/0146115 A1 | 8/2003 | Sharp | |
| 2003/0148004 A1 * | 8/2003 | Kawaguchi et al. | 426/115 |
| 2003/0152634 A1 | 8/2003 | Bodmeier | |
| 2003/0160067 A1 | 8/2003 | Gupta et al. | |
| 2003/0194431 A1 | 10/2003 | Miller et al. | |
| 2003/0233083 A1 | 12/2003 | Houwiert et al. | |
| 2004/0078023 A1 * | 4/2004 | Gollier et al. | 604/410 |
| 2004/0118789 A1 * | 6/2004 | Rothman et al. | 210/806 |
| 2004/0134222 A1 | 7/2004 | Holley, Jr. | |
| 2004/0134802 A1 | 7/2004 | Inoue et al. | |
| 2004/0223801 A1 | 11/2004 | Detwiler et al. | |
| 2005/0087456 A1 * | 4/2005 | Oka et al. | 206/219 |
| 2005/0148993 A1 * | 7/2005 | Mathias et al. | 604/409 |
| 2005/0177128 A1 | 8/2005 | Nagao et al. | |
| 2005/0194060 A1 | 9/2005 | Houwaert et al. | |
| 2007/0060903 A1 * | 3/2007 | Miyajima et al. | 604/410 |
| 2007/0088314 A1 * | 4/2007 | Gollier et al. | 604/410 |

FOREIGN PATENT DOCUMENTS

| | | |
|---|---|---|
| DE | 44 10 876 | 10/1995 |
| DE | 691 11 430 | 1/1996 |
| DE | 298 14 215 | 10/1998 |
| DE | 694 10 351 | 10/1998 |
| DE | 198 11 276 | 1/2000 |
| DE | 199 03 705 | 7/2000 |
| DE | 201 11 308 | 12/2001 |
| EP | 0 157 579 | 10/1985 |
| EP | 0 345 774 | 12/1989 |
| EP | 0 444 900 | 9/1991 |
| EP | 0 513 364 | 11/1992 |
| EP | 0 619 998 | 10/1994 |
| EP | 0 639 364 | 2/1995 |
| EP | 0 920 849 | 6/1999 |
| EP | 0 972 506 | 1/2000 |
| EP | 1 103 487 | 11/2000 |
| EP | 1 101 483 | 5/2001 |

(56) References Cited

FOREIGN PATENT DOCUMENTS

| | | |
|---|---|---|
| EP | 1 106 644 | 6/2001 |
| EP | 1 161 932 | 12/2001 |
| EP | 1 350 739 | 10/2003 |
| GB | 2 134 067 | 8/1984 |
| JP | 01-240469 | 9/1989 |
| JP | 04-097751 | 9/1989 |
| JP | 05-068702 | 3/1993 |
| JP | 06-039018 | 2/1994 |
| JP | 07-303694 | 10/1995 |
| JP | 08-100089 | 4/1996 |
| JP | 08-215285 | 8/1996 |
| JP | 08-229101 | 9/1996 |
| JP | 08-280774 | 10/1996 |
| JP | 09-010282 | 1/1997 |
| JP | 09-122205 | 5/1997 |
| JP | 09-176336 | 7/1997 |
| JP | 09-327498 | 12/1997 |
| JP | 10-015033 | 1/1998 |
| JP | 10-024087 | 1/1998 |
| JP | 10-024088 | 1/1998 |
| JP | 10-043272 | 2/1998 |
| JP | 10-085305 | 4/1998 |
| JP | 10-085306 | 4/1998 |
| JP | 10-108893 | 4/1998 |
| JP | 10-071185 | 5/1998 |
| JP | 10-179689 | 7/1998 |
| JP | 10-201819 | 8/1998 |
| JP | 10-201820 | 8/1998 |
| JP | 10-201821 | 8/1998 |
| JP | 10-216200 | 8/1998 |
| JP | 10-218252 | 8/1998 |
| JP | 10-236541 | 9/1998 |
| JP | 10-243990 | 9/1998 |
| JP | 10-277132 | 10/1998 |
| JP | 11-009659 | 1/1999 |
| JP | 11-076367 | 3/1999 |
| JP | 11-079258 | 3/1999 |
| JP | 11-114016 | 4/1999 |
| JP | 11-155930 | 6/1999 |
| JP | 11-285518 | 10/1999 |
| JP | 2000-005276 | 1/2000 |
| JP | 2000-007050 | 1/2000 |
| JP | 2000-014746 | 1/2000 |
| JP | 2000-187111 | 7/2000 |
| JP | 2000-262589 | 9/2000 |
| JP | 2000-262591 | 9/2000 |
| JP | 2000-316951 | 11/2000 |
| JP | 2000-390350 | 11/2000 |
| JP | 2001-046470 | 2/2001 |
| JP | 2001-097394 | 4/2001 |
| JP | 2002-052065 | 2/2002 |
| JP | 2002-136570 | 5/2002 |
| JP | 2002-160771 | 6/2002 |
| JP | 2002-165862 | 6/2002 |
| JP | 2002-200140 | 7/2002 |
| JP | 2002-136570 | 9/2002 |
| JP | 2003-054574 | 2/2003 |
| JP | 2003-081356 | 3/2003 |
| JP | 2003-159308 | 6/2003 |
| JP | 2003-205013 | 7/2003 |
| JP | 2003-246731 | 9/2003 |
| JP | 2003-284761 | 10/2003 |
| JP | 2004-059138 | 2/2004 |
| JP | 2006-43061 | 2/2006 |
| WO | WO 83/01569 | 5/1983 |
| WO | WO 92/02271 | 2/1992 |
| WO | WO 94/16664 | 8/1994 |
| WO | WO 95/07665 | 5/1995 |
| WO | WO 95/26117 | 9/1995 |
| WO | WO 97/37628 | 10/1997 |
| WO | WO 97/42897 | 11/1997 |
| WO | WO 98/10733 | 3/1998 |
| WO | WO 98/34842 | 8/1998 |
| WO | WO 99/23966 | 5/1999 |
| WO | WO 99/24086 | 5/1999 |
| WO | WO 99/27885 | 6/1999 |
| WO | WO 00/30850 | 6/2000 |
| WO | WO 00/57935 | 10/2000 |
| WO | WO 01/08732 | 2/2001 |
| WO | WO 01/35898 | 5/2001 |
| WO | WO 01/89478 | 11/2001 |
| WO | WO 02/01129 | 1/2002 |
| WO | WO 03/068136 | 8/2003 |
| WO | WO 03/075982 | 9/2003 |
| WO | WO 03/082549 | 10/2003 |
| WO | WO 03/092574 | 11/2003 |
| WO | 2005/084607 | 9/2005 |

OTHER PUBLICATIONS

English Translation of JP 2000-390350.
Partial English Translation of EP 1 103 487.
Australian Patent Office Written Opinion dated Apr. 8, 2009, 5 pgs.
Taiwan Office Action for Taiwan Application No. 096112430, dated Jul. 1, 2013.
Korean Office Action for Korean Application No. 10-2008-7026726, dated Jun. 13, 2013.
Japanese Office Action for Japanese Application No. 2012-217139, mailed Jan. 21, 2014.
Japanese Notice of Final Rejection for Japanese Patent Application No. 2009-509995 dated Jul. 2, 2012.
Japanese Office Action for Japanese Application No. 2012-217139, dated Sep. 25, 2013.
Office Action dated Oct. 15, 2012, in related Mexican national stage application No. MX/a/2008/013939, 8 pages.

* cited by examiner

MULTIPLE CHAMBER CONTAINER WITH MISTAKE PROOF ADMINISTRATION SYSTEM

BACKGROUND

Multiple chamber containers that allow separate storage of incompatible or unstable components are known. These containers typically include an outlet and one or more peel seals or frangible seals that separate the individual chambers. The peel seal is typically activated or ruptured in order to mix the separately stored components inside the container prior to administration. The components may be either a powder or a liquid and may form an admixed therapeutic or medical solution. After admixture, the solution is typically administered (through the outlet) to a person or patient. Administration may be performed by a health care professional. Alternatively, the solution may be self-administered by the person to receive the solution.

In many applications, administration of an unmixed solution may cause discomfort, adverse side effects, or harm to a patient. Consequently, a need exists for a multiple chamber container that prevents discharge of unmixed components from the outlet.

SUMMARY

The present disclosure sets forth a multiple chamber container that ensures correct sequential opening between a partition peel seal or seals and an outlet isolation peel seal. In so doing, the present container ensures that unmixed components are not dispensed from the container.

In an embodiment, the multiple chamber container includes a container body sealed around a peripheral edge to define an interior and an outlet for providing fluid communication from the interior. In an embodiment, the outlet may traverse the peripheral edge. A first peel seal defines chambers in the container, the first peel seal having a first projecting portion. The container also includes a second peel seal isolating the outlet from the chambers, the second peel seal having a second projecting portion. In an embodiment, the second peel seal includes opposing ends with each end contacting the same container side to isolate the outlet from the chambers. In an embodiment, the second peel seal may define an outlet chamber. Alternatively, the second peel seal may cover the inlet end of the outlet.

In an embodiment, the first peel seal may have a peel seal force less than the peel seal force of the second peel seal. In a further embodiment, the first peel seal may have a peel seal force from about 10.0 N/15 mm to about 29.0 N/15 mm and the second peel seal may have a peel seal force from about 13.0 N/15 mm to about 35.0 N/15 mm. In yet a further embodiment, the difference between the first and second peel seal forces is from about 0.1 N/15 mm to about 13 N/15 mm.

In an embodiment, the first and/or second projecting portion may have a shape selected from arcuate, polygonal, pointed, jagged, triangular, and combinations thereof.

In an embodiment, the first projecting portion projects toward the second projecting portion. In a further embodiment, the first projecting portion, the second projecting portion, and the outlet are in a linear relation with respect to each other.

In an embodiment, the first and/or second peel seal may include an outer edge, and a portion of the outer edge may include a serrated portion.

In an embodiment, a multiple chamber container is provided that includes a container body sealed around a peripheral edge with an outlet traversing the edge and a first peel seal having a projection portion. The container may include a second peel seal that isolates the outlet, the second peel seal having a second projecting portion. The first and second peel seals may be configured to define a substantially symmetrical chamber. In an embodiment, the chamber may include an axis of symmetry extending between the first and second projecting portions.

In an embodiment, the first projecting portion and the second projecting portion may define respective first and second seal contact angles in the chamber. The seal contact angles may be substantially equal or substantially similar in size.

In an embodiment, the second peel seal may have an activation energy that is greater than or equal to the activation energy of the first peel seal. The activation energy of the second peel seal may be about 1 to 5 times greater than the activation energy of the first peel seal. The activation energy for the first peel seal may be from about 0.10 to about 0.20 Joules. The activation energy for the second peel seal may be from about 0.25 to about 0.50 Joules. In a further embodiment, the first peel seal may include an outer edge having a serrated portion.

In an embodiment, a method for peeling a container having a peelable seal is provided. The method includes providing a container body sealed around a peripheral edge with an outlet traversing the edge. The container may include a first peel seal having a projecting portion and a second peel seal isolating the outlet. The second peel seal may have a second projecting portion, and the first and second peel seals may define a substantially symmetrical chamber. The method may further entail activating the first peel seal, and further activating the second peel seal.

In an embodiment, the second peel seal is activated only after the first peel seal has been activated.

In an embodiment, the method includes initiating the activation of the first peel seal at the first projecting portion. In a further embodiment, the activation of the second peel seal may be initiated at the second projecting portion.

In yet a further embodiment, the first peel seal may define two chambers, with each chamber containing a respective component. The method may further entail admixing the components before activating the second peel seal. In a further embodiment, the admixed components may be dispensed from the outlet.

Additional features and advantages are described herein, and will be apparent from, the following Detailed Description and the figures.

DETAILED DESCRIPTION

Figure 1:
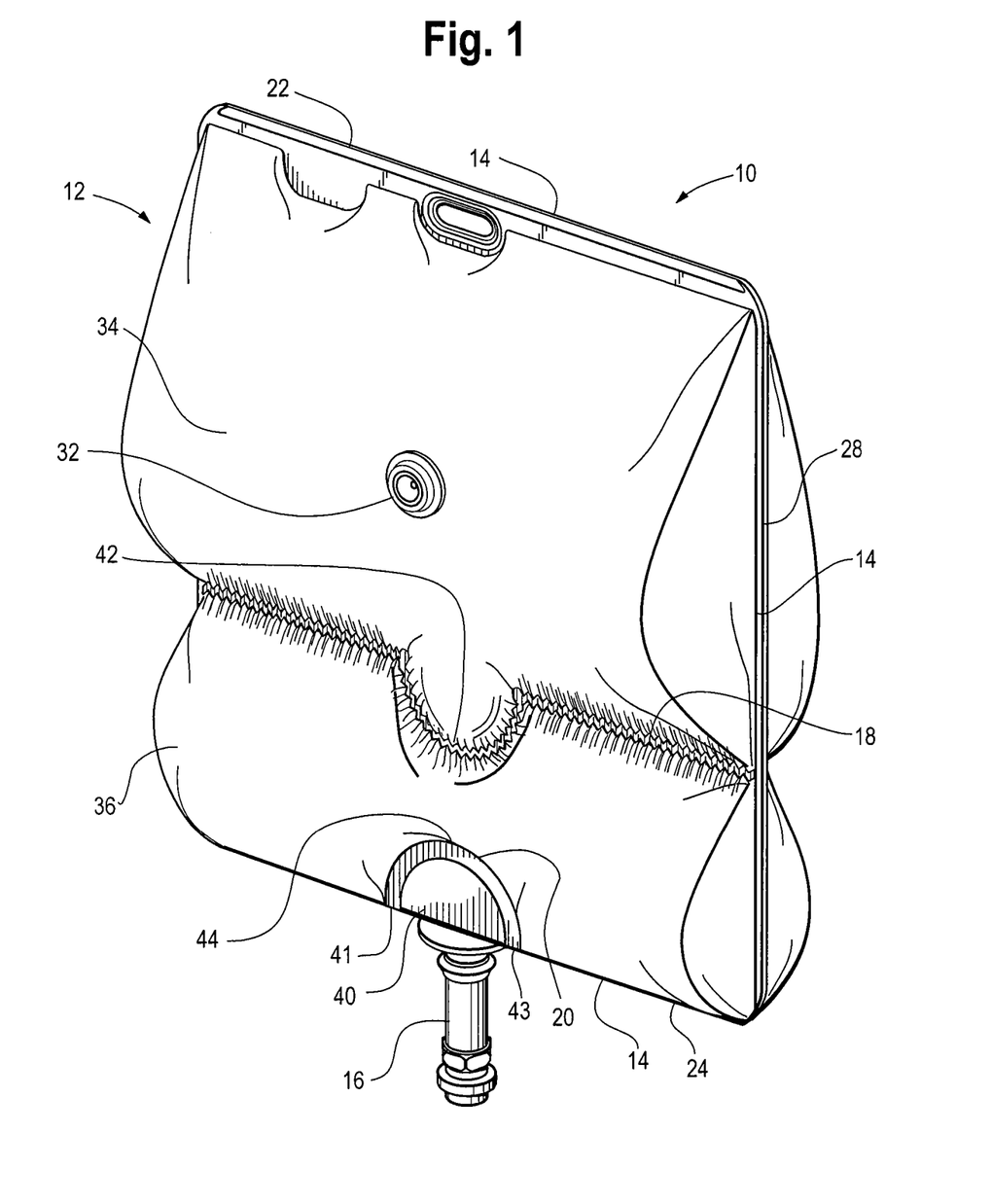
FIG. 1 is a perspective view of a multiple chamber container in accordance with the present disclosure.

Referring to the Figures generally, where like reference numerals denote like structure and elements, and in particular to FIG. 1, a perspective view of container 10 having a body 12 with a peripheral edge 14, an outlet 16, a first peel seal 18 and a second peel 20 seal is shown. Peripheral edge 14 includes a top edge 22, a bottom edge 24, and opposing side edges 26 and 28. In an embodiment, container 10 may include a permanent seal substantially coextensive along peripheral edge 14 to enclose container 10 and form or otherwise define a container interior. The permanent seal may be a heat seal, an adhesive seal, a radio frequency seal, a thermal transfer weld, a solvent bond, or a laser weld as is commonly known in the art.

In an embodiment, outlet 16 may extend across or otherwise traverse peripheral edge 14 to provide fluid communication between the container interior and the container exterior. Alternately, outlet 16 may be attached to an outside surface of peripheral edge 14, the outlet adapted to pierce the container at the peripheral edge thereof, thereby establishing fluid communication between the container interior and the container exterior. In an embodiment, outlet 16 may be disposed along bottom edge 24 of the container. Inlet 30 (FIG. 2) of outlet 16 may or may not extend into the container interior. Container 10 may also include a port 32 that may be used to fill container 10 during the container fabrication process or to introduce a further component into the container after the container has been filled and sealed. In an embodiment, container 10 may include a port in each chamber. These ports may be sealed after use. Container 10 may be a form-fill-seal (FFS) container, a seal-fill-seal (SFS) container, or a form-seal-fill (FSF) container as commonly known in the art.

In an embodiment, container 10 may be made of a flexible polymeric material or film as is commonly known in the art. The film may be a single layer or a multiple layered structure as dictated by the contents of container 10. In an embodiment, container 10 may be made of a multiple layer film structure having a seal layer/intermediate layer/external layer configuration. These layers may be adhered to one another directly or with the aid of one or more intervening adhesive tie layers. In a further embodiment, the film may have a seal layer that may include a polyethylene α-olefin copolymer and thermoplastic elastomer blend, a tie layer, an intermediate layer containing a polyamide, a tie layer, and an exterior layer containing a polypropylene.

For example, the film seal layer may be a ternary blend of polypropylene and ethylene random copolymer, linear low density polyethylene (LLDPE) and styrene-ethylene-butylene-styrene tri-block copolymer (SEBS). The intermediate layer may be a blend of nylon 6 and nylon 6I/6T. The external layer may be polypropylene. The tie layers may be a maleic anhydride modified polypropylene. Such a film is disclosed in European Patent No. EP 1 139 969 B1 (incorporated herein by reference in its entirety) and has been found to form suitable multiple chamber containers for storing medical solutions, such as peritoneal dialysis solutions, for example. In an embodiment, the seal layer may be capable of forming a peel seal at a temperature from about 115° C. to about 128° C. and a permanent seal at a temperature from about 126° C. to about 150° C.

In an embodiment, first peel seal 18 extends between sides 26 and 28 to define a first chamber 34 and a second chamber 36. Although FIG. 1 depicts two chambers, it is understood that container 10 may have three, four, five, six, or more chambers. It is further understood that an increase in the number of chambers generally entails an increase in the number of peel seals to create the chambers.

Chambers 34 and 36 may be used to store individual components that may be mixed within the container to form a therapeutic solution or a medical solution as is commonly known in the art. The components may be incompatible with each other, unstable, or sensitive thereby necessitating the provision of separate storage chambers. Admixture of the components typically occurs prior (i.e., within 24 hours) to administration of the mixed solution. At least one component is ordinarily a liquid, but the other components may be in powder or liquid form and may be mixed together to form the final therapeutic or medical solution. Nonlimiting examples of suitable solutions formed by admixing the separately stored components in the disclosed container include nutritional solutions, drug solutions, dialysis solutions, solutions of pharmacological agents including gene therapy and chemotherapy agents, hydration solutions, and many other fluids that may be administered to a patient by intravenous, subcutaneous, intraperitoneal, or other enteral or parenteral pathways. In an embodiment, chambers 34 and 36 each contain a single component, that when mixed together may form a dialysis solution. In a further embodiment, first chamber 34 may contain a low pH solution and second chamber 36 may contain a buffer solution. In a further embodiment, the low pH solution may be a dextrose concentrate solution with a pH from about 1.8 to about 2.2 and the buffer solution may be a bicarbonate concentrate solution with a pH from about 8.6 to about 12, for example a pH from about 8.6 to about 9.8.

Second peel seal 20 may be disposed around outlet 16 to surround outlet 16 or otherwise isolate outlet 16 from the chambers. In an embodiment, second peel seal 20 may isolate outlet 16 from second chamber 36. In an embodiment, second peel seal 20 may define an outlet chamber 40. In a further embodiment, outlet chamber 40 may be empty or otherwise lack a component to be mixed with the components contained in first and second chambers 34, 36. Alternatively, second peel seal 20 may cover inlet side 30 of outlet 16. It is understood the first and/or second peel seals 18, 20 may/may not have a uniform width.

Figure 2:
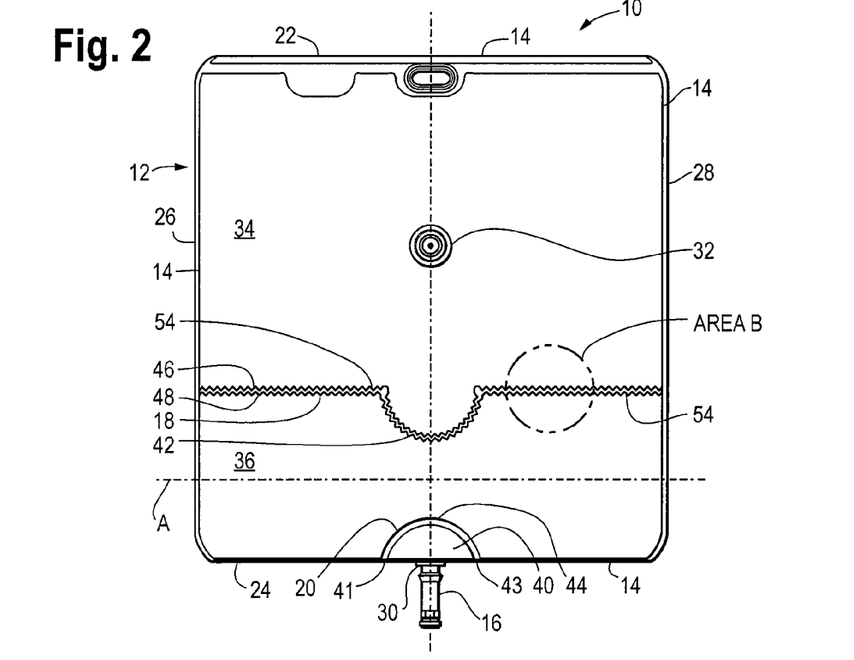
FIG. 2 is a plan view of a multiple chamber container in accordance with the present disclosure.

In an embodiment, second peel seal 20 may have ends 41 and 43 that contact the same edge of container 10 as shown in FIGS. 1 and 2. In an embodiment, ends 41 and 43 may each contact bottom edge 24 to isolate outlet 16 from second chamber 36. This advantageously reduces the container area required to isolate the outlet and simultaneously provides greater area, volume, or storage capacity for second chamber 36.

In an embodiment, each peel seal may also include a projecting portion. First peel seal 18 may include first projecting portion 42 and second peel seal 20 may include second projecting portion 44. In a further embodiment, first projecting portion 42 may project toward second projecting portion 44. In an embodiment, second peel seal 20 may be arcuate in shape as shown in FIG. 1. In this embodiment, it is understood that projecting portion 44 may include the most inwardly projecting area of second peel seal 20. Alternatively, the second peel seal may be the second projecting portion. In an embodiment, first projecting portion 42, second projecting portion 44 and outlet 16 are in a substantially linear relation with respect to one another.

In an embodiment, each peel seal may also have a corresponding peel seal force (or peel strength) and/or an activation energy for activating, rupturing, or otherwise opening each peel seal. In a further embodiment, initial activation of each peel seal may occur at first projecting portion 42 and second projecting portion 44 respectively. In an embodiment, the first and second peel seals are configured or prepared to provide correct sequential opening (CSO). In CSO, first peel seal 18 activates before the activation of second peel seal 20. When container 10 includes more than two component chambers, CSO entails that the isolation peel seal (i.e., the peel seal that isolates the outlet from the chambers and second peel seal 20 in FIG. 1) is the last peel seal to activate. In other words, CSO entails the activation of any or all partition seals prior to the activation of the isolation seal. Consequently, CSO ensures that the components in the container chambers are thoroughly admixed before 1) activation of the isolation peel seal and 2) administration of the mixed components to a patient through outlet 16. In certain embodiments, CSO may also require that peel seals between component chambers activate in a specified order to facilitate thorough admixing or to ensure that reactive components interact in a defined and predictable order.

It has been found that correct sequential opening is influenced by several factors. These factors include 1) the profile or geometry of the chambers, 2) the seal contact angles (the angle formed between the container film and the peel seal), 3) the peel seal force (or peel strength), 4) the peel seal activation energy, and 5) isobar pressurization. Of course, highly reliable or guaranteed CSO may be achieved with large differences in peel seal forces and/or peel seal activation energies between the partition seal and the isolation seal or by providing the isolation seal with a very high activation energy. However, it has been found that peel seals with peel seal forces greater than about 30 N/15 mm are difficult to open, particularly for the elderly, infirm, or those with limited dexterity. As the anticipated users, particularly self-administration users, of the present container would frequently fall into one or more of the aforementioned categories, conventional containers relying on large peel seal forces for assured CSO are not practical in many circumstances.

The present disclosure is directed, in part, to the surprising discovery that the chamber geometry or chamber profile may influence CSO. In particular, it has been discovered that a container having a symmetrical chamber geometry yields an additional parameter that may be used to more accurately control CSO. Thus, the creation of a symmetrical chamber defined in part by the isolation peel seal advantageously provides greater control in the formation of a multiple chamber container having correct sequential opening. Moreover, a symmetrical chamber profile further provides uniformity or substantial similarity between the size of the aperture angles in the chamber. The advantages of these features will be further described below.

Turning to FIGS. 2-5, FIGS. 2 and 3 show containers 10 and 100 respectively. FIG. 2 shows container 10 with axis of symmetry A extending through chamber 36 between first and second projecting portions 42 and 44. Axis of symmetry A may be substantially normal or otherwise substantially perpendicular to a line that extends through outlet 16 as shown in FIG. 2. Alternatively, axis of symmetry A may be substantially parallel to first peel seal 18 or bottom peripheral edge 24. Axis of symmetry A may also traverse one or both side edges 26, 28. Axis of symmetry A indicates that chamber 36 is bilaterally symmetrical. In other words, bisection of chamber 36 along axis A demonstrates that first peel seal 18 and first projecting portion 42 are symmetrically arranged or disposed with respect to bottom edge 24, second peel seal 20, and second projecting portion 44. Stated differently, first projecting portion 42 and second projecting portion 44 are mirror images of one another along axis A.

Figure 3:
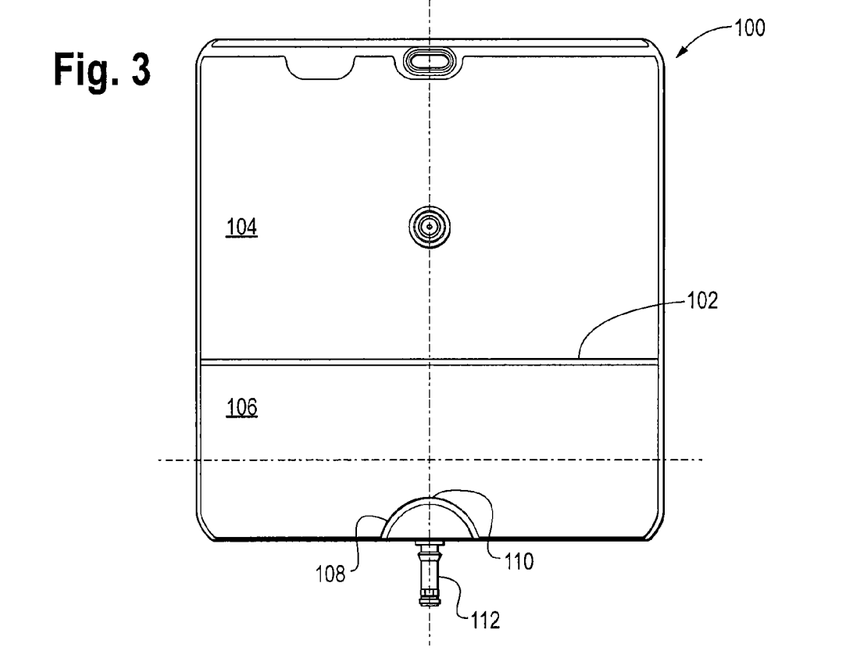
FIG. 3 is a plan view of a multiple chamber container.

Container 100 includes first peel seal 102 that is substantially linear in shape or otherwise lacks a projecting portion. First peel seal 102 defines chambers 104 and 106. Second peel seal 108 has projecting portion 110. Second peel seal 108 isolates outlet 112. Noteworthy, is that chamber 106 lacks an axis of symmetry between peel seals 102 and 108, and no mirror image relationship exists between first peel seal 102 and second peel 108.

Figure 4:
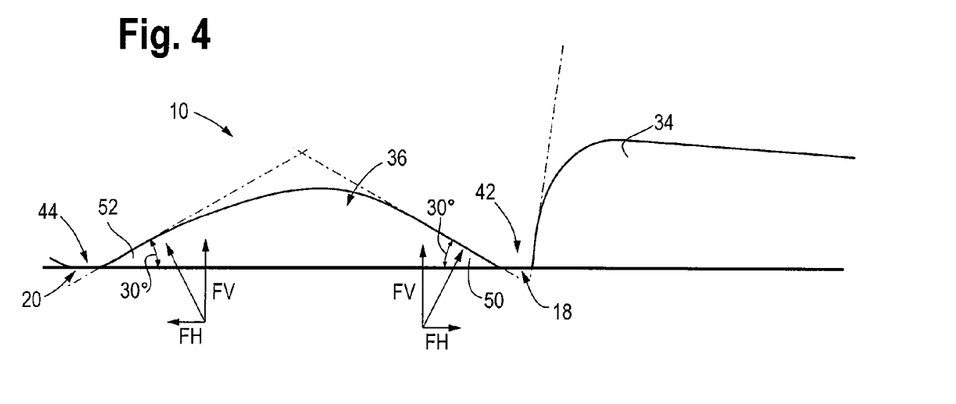
FIG. 4 is a schematic representation of a multiple chamber container in accordance with the present disclosure.
Figure 5:
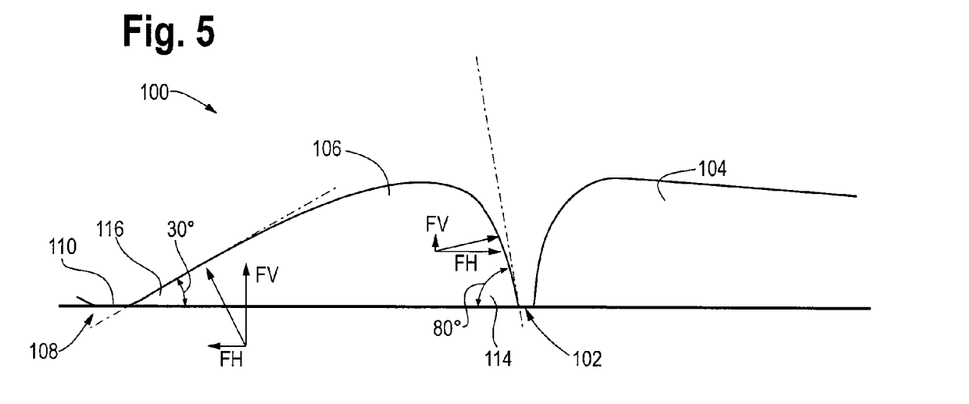
FIG. 5 is a schematic representation of a multiple chamber container.

FIGS. 4 and 5 respectively depict a schematic representation of the chamber geometry profile for containers 10 and 100. FIG. 4 shows that in container 10, first projecting portion 42 and the mirror image thereto, second projecting portion 44, form respective seal contact angles 50 and 52 in chamber 36. Seal contact angles 50 and 52 are each substantially similar in size. In an embodiment, the size for each seal contact angle 50 and 52 may be about 30° or less. In contrast, FIG. 5 shows that in container 100, first peel seal 102 forms seal contact angle 114 and projecting portion 110 of second peel seal 108 forms seal contact angle 116 in chamber 106. Contact angle 114 is larger than contact angle 116. In an embodiment, seal contact angle 114 may be about 80° and seal contact angle 116 may be about 30°. Consequently, the size of seal contact angle 114 may be about two times the size of seal contact angle 116.

FIGS. 4 and 5 further depict the application of a hydraulic force upon containers 10 and 100 respectively. Each hydraulic force is broken down into its horizontal force component (FH) and vertical force component (FV). Provided all peel seal parameters are constant, it is understood that the first peel seal to open is the seal with the largest vertical force component. In FIG. 4, the vertical force component for first projecting portion 42 is substantially the same or equal to the vertical force component for projecting portion 44. Accordingly, in container 10, first and second projecting portions 42 and 44 will activate simultaneously or substantially simultaneously. However, in FIG. 5, second peel seal 108 has a greater vertical force component than the vertical force component for first peel seal 102 (the partition seal). Consequently, in container 100, second peel seal 108 (the outlet isolation peel seal) activates before the activation of first peel seal 102, all other seal parameters being constant.

Thus, it has been found that by constructing a partition seal in the mirror image of the isolation seal, a chamber having a symmetrical geometric profile may be formed. An isolation peel seal in conjunction with a mirror-image peel seal or partition seal yields a storage chamber that is geometrically symmetrical. Moreover, peel seal projecting portions that are in symmetrical relation to one another yield smaller chamber contact angles. Substantially equal, small contact angles may further yield a chamber with lower peel seal activation energies when compared to the peel seal activation energies for an asymmetrical chamber and/or a chamber with unequal or large contact angles. Moreover, the concept of 1) a symmetrical chamber defined in part by the isolation peel seal with 2) mirror-image projecting portions may be utilized to form a multiple chamber container that provides assured CSO and requires lower than conventional peel seal activation energies. A container with assured CSO and lower activation forces is beneficial as it facilitates operation of the container. This is particularly advantageous for elderly, weak, feeble, frail, incapacitated, and/or infirm users, particularly self-administration users, of the present container.

In an embodiment, first peel seal 18 may be formed to have a lower peel seal force than the peel seal force of second peel seal 20 in any manner as is commonly known in the art. For example, first peel seal 18 may be formed by applying opposing heat seal dies to the container at a temperature from about 115° C. to about 128° C. and pressure of about 3 bar to about 5 bar. In an embodiment, first peel seal 18 may have a peel seal force from about 10.0 N/15 mm to about 29.0 N/15 mm (post-sterilization), or about 10.2 N/15 mm to about 16.0 N/15 mm. In a further embodiment, the first peel seal may be formed at a temperature of about 121° C. and have a peel seal force of about 10.4 N/15 mm. In yet a further embodiment, the first peel seal may be formed at a temperature of about 122° C. and have a peel seal force of about 17.0 N/15 mm.

Figure 6:
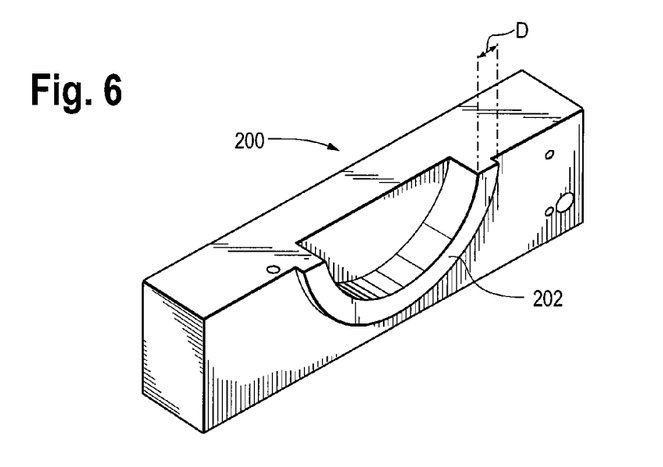
FIG. 6 is a perspective view of a sealing die in accordance with an embodiment of the present disclosure.

Similarly, second peel seal 20 may be formed by applying a heat seal die to the container at a temperature of about 115° C. to about 128° C. and a pressure of about 3 bar to about 5 bar. In an embodiment, second peel seal 20 may be formed at a temperature from about 123° C. to about 126° C. FIG. 6 shows a sealing die 200 that may be used to form second peel seal 20 as is commonly known in the art. Die 200 may be a Teflon-coated annealed die which advantageously avoids warping and avoids adhesion to molten or melted polymeric materials. Projection 202 may have a width D. In an embodiment, width D may have a length of about 12 mm. A die similar to die 200 may be used to form first peel seal 18. In an embodiment, second peel seal 20 may have a peel seal force from about 13.0 N/15 mm to about 35.0 N/15 mm (post sterilization), or about 15.0 N/15 mm to about 25.0 N/15 mm. In a further embodiment, the second peel seal may be formed at a temperature of about 125° C. and have a peel force of about 17.5 N/15 mm. In yet a further embodiment, the second peel seal may be formed at a temperature of about 126° C. and have a peel seal force of about 20-21 N/15 mm.

In an embodiment, the difference between the first and second peel seal forces may be from about 0.1 N to about 13.0 N, or about 2.0 N to about 10.0 N. In a further embodiment, the difference between the first peel seal force and the second peel seal force may be about 7.1 N/15 mm. In yet a further embodiment, the difference between the first peel seal force and the second peel seal force may be about 5.0 N/15 mm. The present container advantageously provides a highly reliable correct sequentially opening container with an overall low peel seal force range (i.e., 10-20 N/15 mm, in an embodiment). This stands as a marked improvement over conventional multiple chamber containers wherein the required peel seal force range is between about 10-40 N/15 mm for the partition peel seal and about 25-40 N/15 mm for the isolation peel seal. The present container advantageously provides highly reliable correct sequential opening with low peel seal forces.

In an embodiment, first peel seal 18 and/or first projecting portion 42 may include outer edges 46 and 48 as shown in FIG. 2. One or both edges 46 and 48 may include a serrated portion 54. Serrated portion 54 may extend along a portion of one or both of edges 46 and 48. In an embodiment, serrated portion 54 may be substantially coextensive or otherwise extend along the entire length of one or both edges 46 and 48. Provision of serrated portion 54 reduces the activation energy (i.e., the energy required to initially activate the peel seal) of first peel seal 18. Lowering the activation energy is advantageous as it lowers the force required to initially rupture the peel seal. Second peel seal 20 may include serrated portions to alter the activation energy thereof in a similar manner as will be described in detail below.

In an embodiment, first peel seal 18 may have a first activation energy and second peel seal 20 may have a second activation energy, with the second activation energy being greater than the first activation energy. In other words, first peel seal 18 requires less effort to open and opens more readily and before second peel seal 20. Alternatively, the first and second activation energies may be approximately equal, in which case the first and second peel seals may open simultaneously. Correct sequential opening may be further ensured by making first peel seal 18 slightly narrower than second peel seal 20. In another embodiment, the second activation energy may be from about 1 times to about 5 times the first activation energy. In a further embodiment, the second activation energy may be from about 1 times to about 2 times the first activation energy. The first activation energy may be from about 0.10 Joules to about 0.20 Joules. The second activation energy may be from about 0.25 Joules to about 0.50 Joules.

Figure 7:
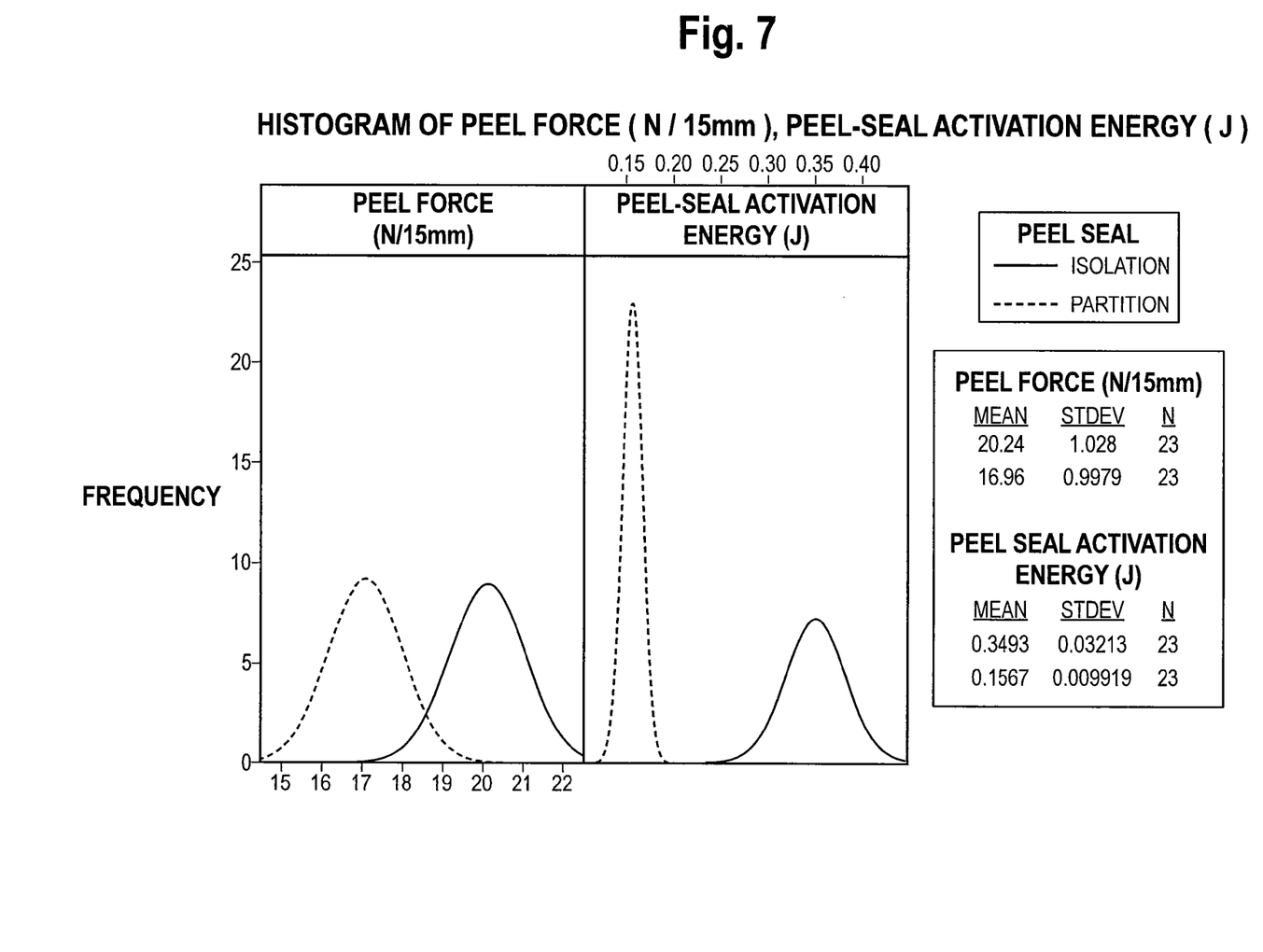
FIG. 7 is a histogram depicting peel force and activation energy in accordance with an embodiment of the present disclosure.

FIG. 7 illustrates a histogram depicting the Peel Force (or peel seal force) and the Peel Seal Activation Energy (or activation energy) for first (partition) seal 18 (dotted line) and second (isolation) seal 20 (solid line). As shown in FIG. 7, the peel seal forces for seal 18 and seal 20 may be different. In an embodiment, the peel seal force for seals 18 and 20 may overlap as shown in the Peel Force portion of the histogram. The activation energy for second isolation seal 20 remains greater than the activation energy for first partition seal 18 regardless of the relationship between the peel seal forces of seals 18 and 20. By ensuring that the activation energy of second seal 20 is greater than the activation energy of first seal 18, the present disclosure advantageously provides correct sequential opening of the container regardless of the peel seal strength for each seal 18 and 20.

Figure 8:
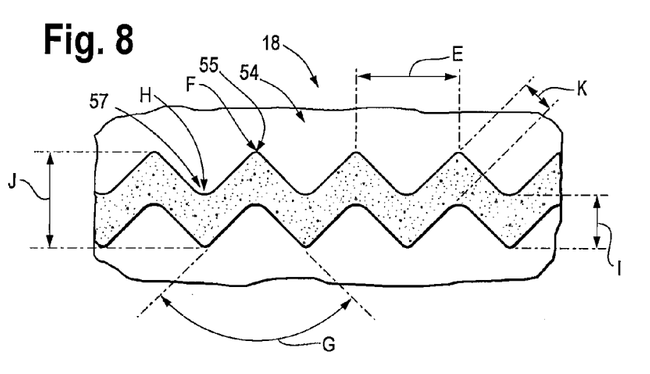
FIG. 8 is an enlarged plan view of Area B of FIG. 2.

Several factors may influence the activation energy for each seal including the peel seal force, the seal contact angles, and the configuration of the peel seal. In an embodiment, the configuration of either peel seal may be modified to alter the activation energy of the peel seal as desired. For example, the configuration of first peel seal 18 may be varied to alter or lower the peel seal activation energy as desired. FIG. 8 is an enlarged view of Area B of FIG. 2 and shows first peel seal 18 with serrated portion 54 which may include peaks 55 and valleys 57. A distance E may extend between adjacent peaks 55. In an embodiment, distance E may have a length from about 7 mm to about 9 mm, or about 8 mm. Each peak 55 may have a corresponding radius of curvature F. Radius of curvature F may have a length from about 0.3 mm to about 0.7 mm, or about 0.5 mm. The slopes between each peak and valley may form an angle G. Angle G may be from about 75° to about 1050, or about 90°. Each valley 57 may also have a radius of curvature H. Radius of curvature H may have a length from about 0.5 mm to about 1.5 mm, or about 1.0 mm. A distance I may extend between peak 55 on one side of seal 18 and a corresponding valley 57 on the other side of seal 18 and aligned with peak 55. Distance I may have a length from about 3.0 mm to about 5.0 mm, or about 4.2 mm. A distance J may extend between valley 57 on one side of seal 18 and a valley 57 disposed on the other side of seal 18. Distance J may have a length from about 6.0 mm to about 8.0 mm, or about 7.5 mm. Peel seal 18 may have a width K. In an embodiment, width K may have a length from about 2 mm to about 3 mm, or about 2.8 mm.

Figure 9:
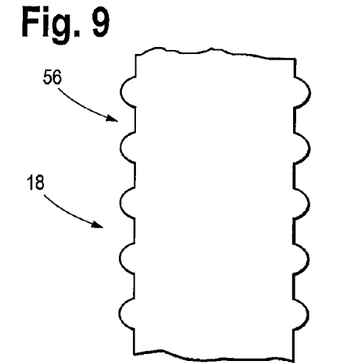
FIG. 9 is a schematic view of a peel seal in accordance with an embodiment of the present disclosure.
Figure 10:
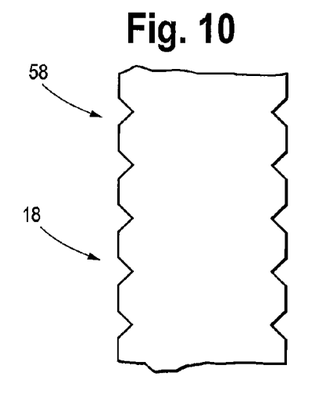
FIG. 10 is a schematic view of a peel seal in accordance with an embodiment of the present disclosure.
Figure 11:
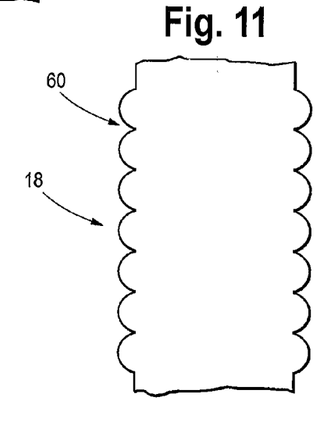
FIG. 11 is a schematic view of a peel seal in accordance with an embodiment of the present disclosure.

First peel seal 18 may have other configurations. For example, first peel seal 18 may include serrated portion 56 having scalloped edges (FIG. 9), serrated portion 58 having trapezoidal shaped edges (FIG. 10), or serrated portion 60 (FIG. 11) having compact scalloped edges. Alternatively, serrated portion 60 may have imbricated triangular shaped edges. In an embodiment, second peel seal 20 and/or second projecting portion 44 may include a serrated portion as discussed above.

Figure 12:
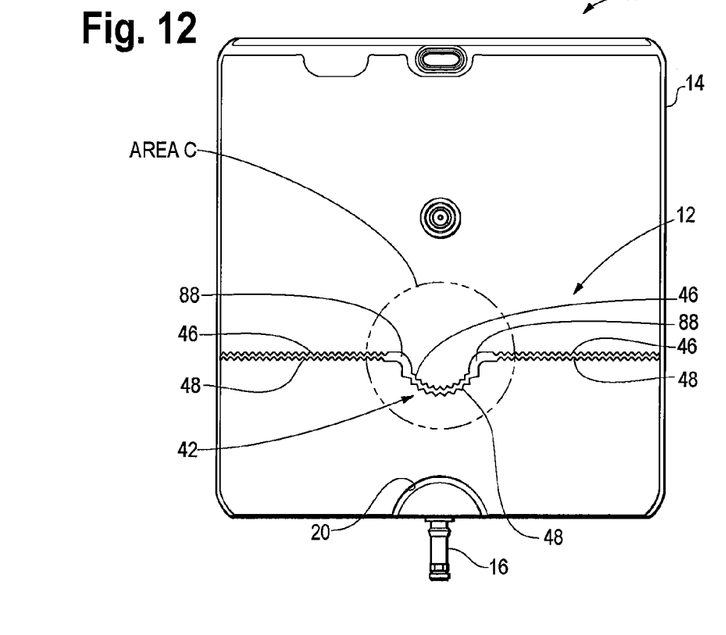
FIG. 12 is a plan view of a multiple chamber container in accordance with an embodiment of the present disclosure.

The shape of first and/or second projecting portions 42, 44 may be varied to alter initial peak activation force and/or the peel seal activation force. FIG. 12 shows container 10 having first peel seal 18 and second peel seal 20. Projecting portion 42 projects from first peel seal 18 and each has outer edges 46 and 48. Elbow portions 88 connect or otherwise adjoin first peel seal 18 with projecting portion 42.

Figure 12A:
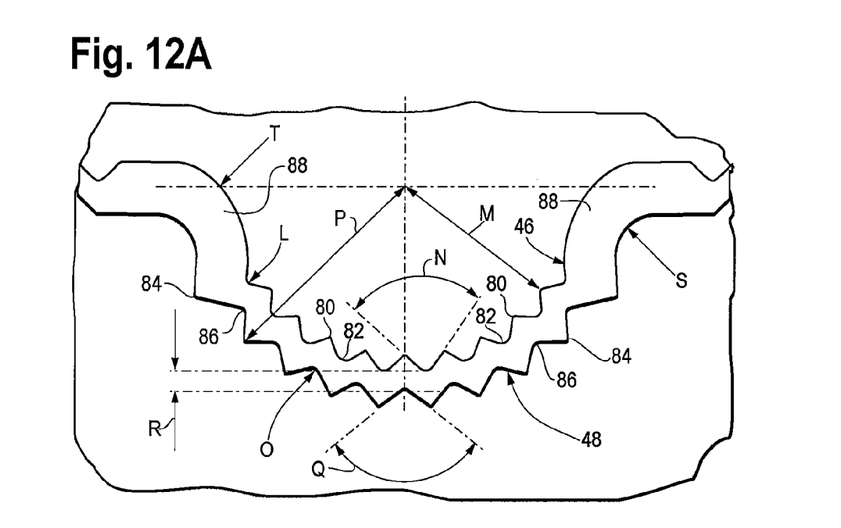
FIG. 12A is an enlarged plan view of Area C of FIG. 12.

FIG. 12A shows an enlarged view of Area C of FIG. 12 showing first projecting portion 42 having outer edges 46 and 48. The shape or configuration of edges 46 and 48 may be the same or different. Edge 46 may be serrated and may include peaks 80 and valleys 82. Similarly, edge 48 may be serrated and may include peaks 84 and valleys 86. The height of peaks 80 and 84 may be the same or different. The depths of valleys 82 and 86 may be the same or different. Valleys 82 of edge 46 may have a radius of curvature L. Radius of curvature L may have a length from about 1.0 mm to about 2.0 mm, or about 1.5 mm. Peaks 80 of edge 46 may have a radius of curvature M. Radius of curvature M may have a length from about 25.0 mm to about 27.0 mm, or about 26.50 mm. The slopes between peaks 82 and valleys 84 may form an angle N. Angle N may be from about 70° to about 90°, or about 79°. Turning to edge 48, each valley 86 may have a radius of curvature O. Radius of curvature O may have a length from about 1.0 mm to about 2.0 mm, or about 1.5 mm. Each peak 84 may have a radius of curvature P. Radius of curvature P may have a length from about 30.0 mm to about 40.0 mm, or about 35.0 mm. The slopes between peaks 84 and valleys 86 may form an angle Q. Angle Q may be from about 90° to about 110°, or about 101.5°. A distance R may extend between valley 82 on edge 48 and valley 86 on edge 46. Distance R may have a length from about 3.0 mm to about 4.0 mm, or about 3.3 mm.

Projecting portion 42 may also include elbows 88 adjoining projection portion 42 to first peel seal 18. On the side of edge 48, elbow 88 may have a radius of curvature S having a length from about 6.0 mm to about 8.0 mm, or about 7.0 mm. Elbow 88 may have a radius of curvature T on the side of edge 46, radius of curvature T having a length from about 14.0 mm to about 16.0 mm, or about 15.0 mm.

Figure 13:
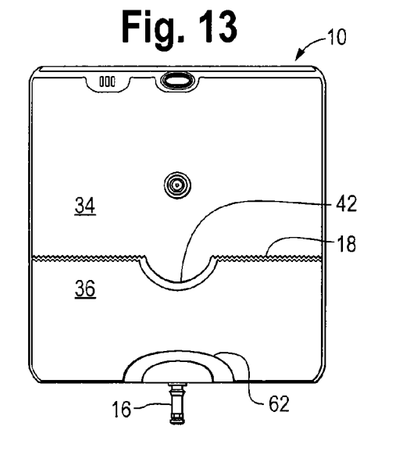
FIG. 13 is a plan view of a multiple chamber container in accordance with an embodiment of the present disclosure.
Figure 14:
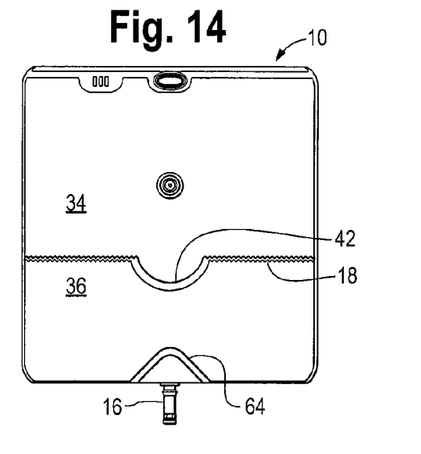
FIG. 14 is a plan view of a multiple chamber container in accordance with an embodiment of the present disclosure.
Figure 15:
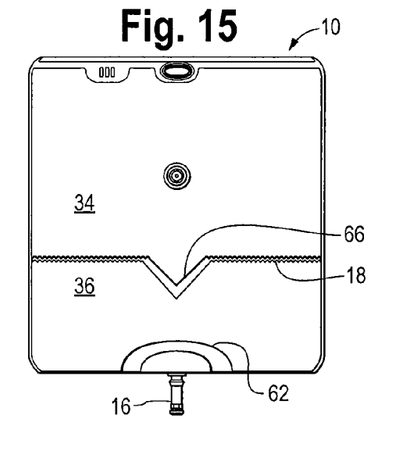
FIG. 15 is a plan view of a multiple chamber container in accordance with an embodiment of the present disclosure.
Figure 16:
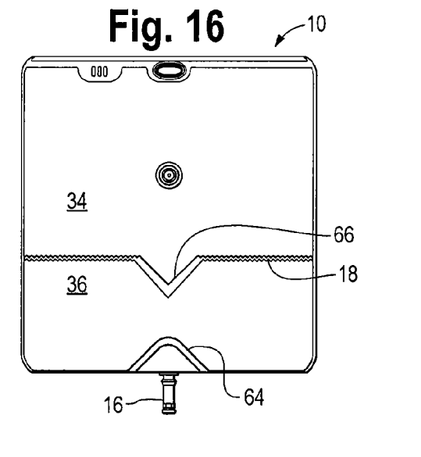
FIG. 16 is a plan view of a multiple chamber container in accordance with an embodiment of the present disclosure.
Figure 17:
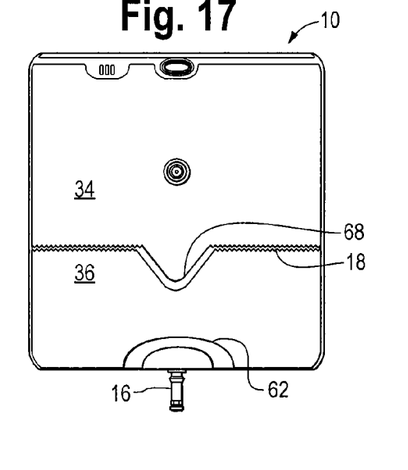
FIG. 17 is a plan view of a multiple chamber container in accordance with an embodiment of the present disclosure.
Figure 18:
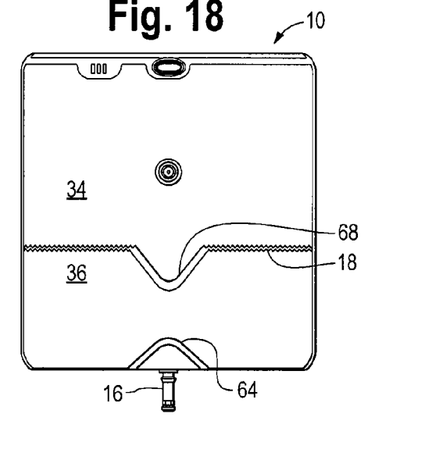
FIG. 18 is a plan view of a multiple chamber container in accordance with an embodiment of the present disclosure.
Figure 19:
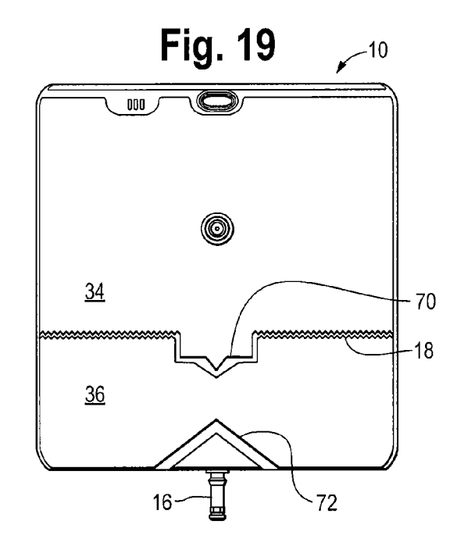
FIG. 19 is a plan view of a multiple chamber container in accordance with an embodiment of the present disclosure.
Figure 20:
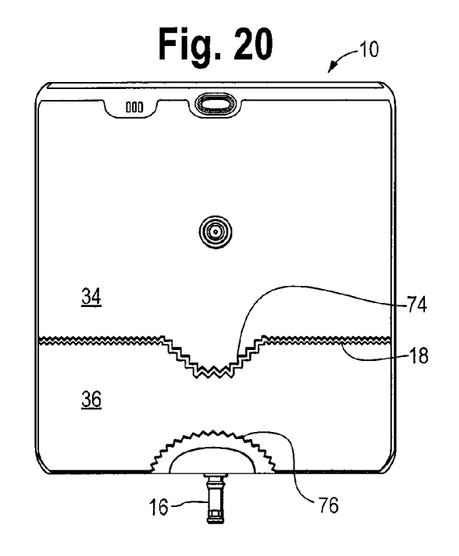
FIG. 20 is a plan view of a multiple chamber container in accordance with an embodiment of the present disclosure.
Figure 21:
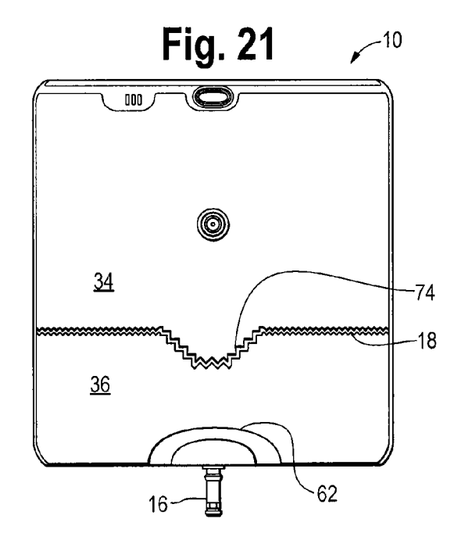
FIG. 21 is a plan view of a multiple chamber container in accordance with an embodiment of the present disclosure.

In an embodiment, the shape of one or both of first and second projecting portions 42, 44 may be selected from arcuate, polygonal, pointed, jagged, triangular, and combinations thereof. In FIG. 1, both first and second projecting portions 42 and 44 are arcuate in shape. Nonlimiting examples of other shapes for the first and second projecting portions are shown in FIGS. 13-21. FIG. 13 shows container 10 having first projecting portion 42 that is arcuate in shape and second projecting portion 62 being a flat arch or elliptical (or half-elliptical) in shape. FIG. 14 shows container 10 having arcuate first projecting portion 42 and second projecting portion 64 that is arcuately pointed in shape. FIG. 15 shows container 10 having first projecting portion 66 that is pointed or triangular in shape and second projecting portion 62 having a half-elliptical shape. FIG. 16 shows container 10 having pointed first projecting portion 66 and arcuate pointed second projecting portion 64. FIG. 17 shows container 10 having first projecting portion 68 having an arcuately pointed shape and second projecting portion 62 that is half-elliptical in shape. FIG. 18 shows container 10 having first projecting portion 68 that is arcuately pointed and second projecting portion 64 that is arcuately pointed. FIG. 19 shows container 10 having first projecting portion 70 that is polygonal in shape and second projecting portion 72 that is pointed. FIG. 20 shows container 10 having first projecting portion 74 having a jagged shape and second projecting portion 76 having a jagged shape or edge. FIG. 21 shows container 10 having jagged first projecting portion 74 and second projecting portion 62 that is half-elliptical in shape. It is understood that first and second projecting portions may include other shapes or configurations.

In an embodiment, a method for peeling the container is provided. The method may include providing a container body sealed around a peripheral edge to define an interior and an outlet providing fluid communication with the container interior, a first peel seal having a projecting portion, a second peel seal isolating the outlet, the second peel seal having a second projecting portion, and the first and second peel seals defining a symmetrical chamber. The method may further include activating the first peel seal and the second peel seal. In an embodiment, the activation of the second peel seal occurs only after the activation of the first peel seal. In yet a further embodiment, the activation of the first peel seal may be initiated at the first projecting portion and the activation of the second peel seal may be initiated at the second projecting portion.

In a further embodiment, the first peel seal may define two storage chambers, each chamber holding a component as previously discussed. The method may include admixing the components in the container before the further activating. In an embodiment, the method may further include dispensing the admixed components from the outlet.

In an embodiment, the method may include rolling or otherwise curling the top edge of the container upon the container body to create, with the first component, a force within the first chamber to rupture or activate the first peel seal. In other words, the container edge may be rolled upon the container to create a fluid force, with the component stored in the first chamber, equal to or greater than the first peel seal activation force to open the first peel seal. This places the first chamber in fluid communication with the second chamber. The rolling of the top edge may continue toward the bottom edge of the container and cause admixture of the first and second components. In an embodiment, the top container edge may continue to be rolled onto the container body toward the bottom container edge to create fluid force, with the admixed components in the chambers, to open or rupture the second peel seal. In an embodiment, the second peel seal has an activation force greater than the activation force of the first peel seal. The admixed components may subsequently be dispensed through the outlet. Alternatively, the seals may be activated in the correct order by applying direct external pressure to the bottom or lower chamber to activate the first seal, then rolling the bag to activate the second seal. This mode of operation may be facilitated by the first projecting portion, which may provide an initiation point for peel seal activation that may be responsive to increased pressure in the bottom chamber.

The present container advantageously 1) isolates the outlet, 2) provides a symmetrical chamber profile that 3) makes the contact angles for the first and second peel seals substantially equal. Incorporation of mirror-image or symmetrically disposed projecting portions in the chamber profile reduces the chamber contact angle size which correspondingly lowers the peel seal activation force. Consequently in an embodiment, the container provides assured correct sequential opening with lower peel seal activation forces when compared to conventional containers or asymmetrical containers. Moreover, regardless of where hydraulic pressure is applied on the container exterior, the present container advantageously assures that the first peel seal will activate before activation of the second peel seal.

By way of example and not limitation, examples of the present invention will now be given.

TABLE 1

| Trial | Parameters | Pre-Sterilization Ave Partition Seal | Pre-Sterilization Ave Isolation Seal | Post-Sterilization Ave of Partition Seal | Post-Sterilization Ave Isolation Seal | Difference Between Peel seals post-Sterilization |
|---|---|---|---|---|---|---|
| Trial A | 124° C./4 bar Peel Seal 121° C. | 22.80 N/15 mm strip | 25.02 N/15 mm strip | 15.43 N/15 mm strip | 15.87 N/15 mm strip | 0.44 N |
| Trial B | 124° C./4 bar Peel Seal 121° C. | 24.56 N/15 mm strip | 23.70 N 15 mm strip | 14.69 N/15 mm strip | 18.00 N/15 mm strip | 3.31 N |
| Trial C | 125° C./4 bar Peel Seal 121° C. | 26.26 N/15 mm strip | 22.72 N/15 mm strip | 12.63 N/15 mm strip | 21.48 N/15 mm strip | 8.85 N |
| Trial D | 125.5° C./4 bar Peel Seal 121° C. | 27.75 N/15 mm strip | 29.45 N/15 mm strip | 13.68 N/15 mm strip | 19.39 N/15 mm strip | 5.71 N |
| Trial E | 126° C./4 bar Peel Seal 121° C. | 31.62 N/15 mm strip | 30.37 N/15 mm strip | 11.89 N/15 mm strip | 24.32 N/15 mm strip | 12.43 N |
| Trial F | 124° C./4 bar Peel Seal 122° C. | 21.95 N/15 mm strip | 28.64 N/15 mm strip | 19.67 N/15 mm strip | 17.13 N/15 mm strip | −2.54 |
| Trial G | 124.5° C./4 bar Peel Seal 122° C. | 23.87 N/15 mm strip | 24.78 N/15 mm strip | 19.19 N/15 mm strip | 19.38 N/15 mm strip | 0.19 N |
| Trial H | 125° C./4 bar Peel Seal 122° C. | 26.52 N/15 mm strip | 24.51 N/15 mm strip | 17.63 N/15 mm strip | 20.34 N/15 mm strip | 2.71 N |
| Trial I | 125.5° C./4 bar Peel Seal 122° C. | 27.10 N/15 mm strip | 29.25 N/15 mm strip | 18.34 N/15 mm strip | 18.86 N/15 mm strip | 0.52 N |
| Trial J | 126° C./4 bar Peel Seal 122° C. | 29.03 N/15 mm strip | 28.42 N/15 mm strip | 17.53 N/15 mm strip | 22.38 N/15 mm strip | 4.85 N |
| Trial K | 123° C./4 bar Peel Seal 120.7° C. | 17.39 N/15 mm strip | 18.15 N/15 mm strip | 10.43 N/15 mm strip | 14.77 N/15 mm strip | 4.43 N |
| Trial L | 123.5° C./4 bar Peel Seal 120.7° C. | 19.67 N/15 mm strip | 19.56 N/15 mm strip | 12.42 N/15 mm strip | 13.95 N/15 mm strip | 1.53 N |
| Trial M | 125° C./4 bar Peel Seal 121° C. | | | 6.02 N/15 mm strip | 17.60 N/15 mm strip | 9.58 N |

TABLE 2

| Trial | Parameters | Pre-Sterilization Isolation Seal | Pre-Sterilization Partition Seal | Post-Sterilization Isolation Seal | Post-Sterilization Partition Seal | Difference Between Peel seals post-Sterilization |
|---|---|---|---|---|---|---|
| Trial A | 125° C./4 bar Peel Seal 121° C. | 28.63 N/15 mm strip | 25.02 N/15 mm strip | 22.05 N/15 mm strip | 14.99 N/15 mm strip | 7.06 N |
| Trial B | 125.5° C./4 bar Peel Seal 121° C. | 28.44 N/15 mm strip | 23.70 N/15 mm strip | 24.45 N/15 mm strip | 14.18 N/15 mm strip | 10.27 N |
| Trial C | 126° C./4 bar Peel Seal 121° C. | 31.54 N/15 mm strip | 22.72 N/15 mm strip | 24.72 N/15 mm strip | 16.65 N/15 mm strip | 8.07 N |
| Trial D | 125° C./4 bar Peel Seal 121° C. | 28.58 N/15 mm strip | 29.45 N/15 mm strip | 21.78 N/15 mm strip | 23.33 N/15 mm strip | −1.55 |
| Trial E | 125.5° C./4 bar Peel Seal 122° C. | 30.77 N/15 mm strip | 30.37 N/15 mm strip | 24.30 N/15 mm strip | 23.63 N/15 mm strip | 0.67 N |
| Trial F | 126° C./4 bar Peel Seal 122° C. | 33.11 N/15 mm strip | 28.64 N/15 mm strip | 26.75 N/15 mm strip | 22.48 N/15 mm strip | 4.27 N |
| Trial G | 124° C./4 bar Peel Seal 121° C. | 25.05 N/15 mm strip | 24.78 N/15 mm strip | 18.37 N/15 mm strip | 16.41 N/15 mm strip | −1.96 |
| Trial H | 124.5° C./4 bar Peel Seal 121° C. | 26.96 N/15 mm strip | 24.51 N/15 mm strip | 20.68 N/15 mm strip | 16.53 N/15 mm strip | 4.15 N |
| Trial I | 124° C./4 bar Peel Seal 122° C. | 25.80 N/15 mm strip | 29.25 N/15 mm strip | 19.05 N/15 mm strip | 21.61 N/15 mm strip | −2.56 |
| Trial J | 124.5° C./4 bar Peel Seal 122° C. | 25.54 N/15 mm strip | 28.42 N/15 mm strip | 19.88 N/15 mm strip | 22.86 N/15 mm strip | −2.98 |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A multiple chamber container comprising:
   a container body sealed around a peripheral edge and having an outlet attached to a bottom peripheral edge;
   a first peel seal defining chambers in the container, the first peel seal having a first projecting portion and an outer edge, at least a portion of the outer edge having a serrated portion; and
   a second peel seal isolating the outlet from the chambers, the second peel seal having a second projecting portion, wherein the first projecting portion projects toward the second projecting portion and the second projecting portion projects toward the first projecting portion substantially symmetrically about an axis of symmetry A that is substantially parallel to at least one of the first peel seal and the bottom peripheral edge.

2. The container of claim 1 wherein the first peel seal has a first peel force and the second peel seal has a second peel force, and wherein the first peel force is less than the second peel force.

3. The container of claim 2 wherein the difference between the first and second peel forces is from about 0.1 N/15 mm to about 15.0 N/15 mm.

4. The container of claim 1 wherein the first peel seal has a peel force from about 10.0 N/15 mm to about 29.0 N/15 mm.

5. The container of claim 1 wherein the second peel seal has a peel force from about 13.0 N/15 mm to about 35.0 N/15 mm.

6. The container of claim 1 wherein the first peel seal has a first activation energy and the second peel seal has a second activation energy, the second activation energy greater than or equal to the first activation energy.

7. The container of claim 6 wherein the second activation energy is from about 1 to about 5 times greater than the first activation energy.

8. The container of claim 6 wherein the second activation energy is from about 1.25 to about 2 times greater than the first activation energy.

9. The container of claim 6 wherein the first activation energy is from about 0.10 Joules to about 0.20 Joules.

10. The container of claim 6 wherein the second activation energy is from about 0.25 Joules to about 0.50 Joules.

11. The container of claim 1 wherein the first projecting portion has a shape selected from the group consisting of arcuate, polygonal, pointed, jagged, triangular, and combinations thereof.

12. The container of claim 1 wherein the second projecting portion has a shape selected from the group consisting of arcuate, polygonal, pointed, jagged, triangular, and combinations thereof.

13. The container of claim 1 wherein the first projecting portion, the second projecting portion, and the outlet are in a substantially linear relation with respect to each other.

14. The container of claim 1 wherein the second peel seal further comprises an outer edge, at least a portion of the outer edge having a serrated portion.

15. The container of claim 1 wherein the second peel seal has opposing ends and the container has a plurality of edges, each end in contact with the same container edge.

16. The container of claim 1 wherein the second peel seal defines an outlet chamber.

17. The container of claim 1 wherein the outlet further comprises an inlet end in communication with the container interior and the second peel seal covers the inlet end.

18. A multiple chamber container comprising:
   a container body sealed around a peripheral edge and having an outlet attached to a bottom peripheral edge;
   a first peel seal having a projecting portion and an outer edge, at least a portion of the outer edge having a serrated portion;
   a second peel seal isolating the outlet, the second peel seal having a second projecting portion, wherein the first projecting portion projects toward the second projecting portion and the second projecting portion projects toward the first projecting portion substantially symmetrically about an axis of symmetry A that is substantially parallel to at least one of the first peel seal and the bottom peripheral edge; and
   the first and second peel seals defining a substantially symmetrical chamber.

19. The container of claim 18 wherein the chamber further comprises an axis of symmetry substantially perpendicular to a line extending through the outlet.

20. The container of claim 18 wherein the first projecting portion and the second projecting portion define respective first and second seal contact angles in the chamber, the seal contact angles being substantially similar in size.

21. The container of claim 20 wherein the seal contact angles are less than or equal to about 30°.

22. The container of claim 18 wherein the first peel seal has an activation force less than an activation force of the second peel seal.

23. A method for opening a container having a peelable seal comprising:
   providing a container body sealed around a peripheral edge and having: 1) an outlet attached to a bottom peripheral edge, 2) a first peel seal having a projecting portion and an outer edge, at least a portion of the outer edge having a serrated portion, and 3) a second peel seal isolating the outlet, the second peel seal having a second projecting portion, wherein the first projecting portion projects toward the second projecting portion and the second projecting portion projects toward the first projecting portion substantially symmetrically about an axis of symmetry A that is substantially parallel to at least one of the first peel seal and the bottom peripheral edge, and the first and second peel seals defining a symmetrical chamber;
   activating the first peel seal; and
   activating the second peel seal.

24. The method of claim 23 wherein the first peel seal activation and the second peel seal activation occur in a predetermined sequence.

25. The method of claim 23 wherein the second peel seal activation occurs only after the first peel seal activation.

26. The method of claim 23 further comprising initiating the activating of the first peel seal at the first projecting portion.

27. The method of claim 23 further comprising initiating the activating of the second peel seal at the second projecting portion.

28. The method of claim 23 wherein the first peel seal defines two chambers, each chamber containing a respective component, the method further comprising admixing the components before the further activating.

29. The method of claim 28 further comprising dispensing the admixed components from the outlet.

\* \* \* \* \*